(12) United States Patent
Ushida

(10) Patent No.: US 6,233,366 B1
(45) Date of Patent: *May 15, 2001

(54) IMAGE PROCESSING METHOD AND APPARATUS

(75) Inventor: Katsutoshi Ushida, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,066

(22) Filed: Sep. 10, 1997

(30) Foreign Application Priority Data

Sep. 11, 1996 (JP) .................................... 8-240472

(51) Int. Cl.$^7$ ...................................... G06K 9/32
(52) U.S. Cl. ............................................ 382/298
(58) Field of Search ................... 382/298, 299, 382/300, 305, 254; 358/298, 400, 470, 1.2, 1.18, 525, 528, 445

(56) References Cited

U.S. PATENT DOCUMENTS

| | | | |
|---|---|---|---|
| 4,717,964 | * 1/1988 | Abe et al. ............................. | 358/283 |
| 4,903,142 | * 2/1990 | Hasebe et al. ......................... | 358/457 |
| 5,259,042 | * 11/1993 | Matsuki et al. ........................ | 382/50 |
| 5,293,254 | * 3/1994 | Eschbach ............................ | 358/445 |
| 5,359,423 | * 10/1994 | Loce ................................. | 358/296 |
| 5,448,654 | * 9/1995 | Katayama et al. .................... | 382/298 |
| 5,638,188 | * 6/1997 | Moro et al. .......................... | 358/456 |
| 5,644,366 | 7/1997 | Ushida et al. ........................ | 343/625 |
| 5,832,141 | * 11/1998 | Ishida et al. ......................... | 382/298 |
| 5,832,184 | * 11/1998 | Konno et al ......................... | 359/102 |

* cited by examiner

Primary Examiner—Leo Boudreau
Assistant Examiner—Kanji Patel
(74) Attorney, Agent, or Firm—Fitzpatrick, Cella, Harper & Scinto

(57) ABSTRACT

Disclosed are an image processing method and apparatus for converting the processed block of bi-level image data to a block having a size conforming to the magnification of zoom processing and deciding, based upon the pixel pattern of the bi-level image data, output values within the converted processed block. The output values are decided in such a manner that pixel density of the bi-level image data is preserved within the converted processed block.

12 Claims, 9 Drawing Sheets

FIG. 5

< LOGIC OF PATTERN 22 >
  OA1 = A1 ; OB1 = B1 ; OA2 = A2 ; OB2 = B2 ;

< LOGIC OF PATTERN 23 >
  OA1 = A1 ; OC1 = B1 ; OA2 = A2 ; OC2 = B2 ;
  if(mode == 1 | mode == 5) {
    if(error >= 2) {
      OB1 = A1 | B1 ;
      OB2 = A2 | B2 ;
      error -= 2 ;
    } else {
      OB1 = A1 & B1 ;
      OB2 = A2 & B2 ;
      error += 2 ;
    }
  } else {
    OB1 = (A1 & B1) | (A2 & B1) | (A1 & A2) ;
    OB2 = (A2 & B2) | (A1 & B2) | (B1 & B2) ;
  }

< LOGIC OF PATTERN 24 >
  OA1 = A1 ; OB1 = A1 ; OC1 = B1 ; OD1 = B1 ;
  OA2 = A2 ; OB2 = A2 ; OC2 = B2 ; OD2 = B2 ;

< LOGIC OF PATTERN 32 >
  OA1 = A1 ; OB1 = B1 ;
  OA3 = A2 ; OB3 = B2 ;
  if((mode == 1) | (mode == 5)) {
    if(error >= 2) {
      OA2 = A1 | A2 ;
      OB2 = B1 | B2 ;
      error -= 2 ;
    } else {
      OA2 = A1 & A2 ;
      OB2 = B1 & B2 ;
      error += 2 ;
    }
  } else {
    OA2 = (A1 & A2) | (A2 & B2) | (B1 & A2) ;
    OB2 = (B1 & B2) | (A1 & B1) | (A1 & B2) :
  }

FIG. 6

< LOGIC OF PATTERN 33 >
```
OA1 = A1 ; OC1 = B1 ; OA3 = A2 ; OC3 = B2 ;
if(mode == 0)
   OB1 = 0 ; OA2 = 0 ; OB2 = 0 ; OC2 = 0 ; OB3 = 0 ;
}else if(mode == 1)
   if(error >= 3){
      OB1 = A1 | B1 ;
      OA2 = A1 | A2 ;
      OB2 = 0 ;
      OC2 = B1 | B2 ;
      OB3 = A2 | B2 ;
      error -= 3 ;
   }else{
      OB1 = A1 | B1 ;
      OA2 = 0 ;
      OB2 = 0 ;
      OC2 = 0 ;
      OB3 = A2 | B2 ;
      error += 1 ;
   }
}else if(mode == 2){
   if(error >= 2){
      OB1 = 1 ;
      OA2 = A1 & A2 ;
      OB2 = 0 ;
      OC2 = B1 & B2 ;
      OB3 = 1 ;
      error -= 2 ;
   }else{
      OB1 = 0 ;
      OA2 = A1 & A2 ;
      OB2 = 1 ;
      OC2 = B1 & B2 ;
      OB3 = 0 ;
      error += 2 ;
   }
}else if(mode == 3){
   if(error >= 2){
      OB1 = A1 & B1 ;
      OA2 = 1 ;
      OB2 = 0 ;
      OC2 = 1 ;
      OB3 = A2 & B2 ;
      error -= 2 ;
   }else{
      OB1 = A1 & B1 ;
      OA2 = 0 ;
      OB2 = 1 ;
      OC2 = 0 ;
      OB3 = A2 & B2 ;
      error += 2 ;
   }
}else if(mode == 4){
   if(error >= 2){
      OB1 = A1 | B1 ;
      OA2 = 0 ;
      OB2 = 1 ;
      OC2 = 0 ;
      OB3 = A2 | B2 ;
      error -= 2 ;
   }else{
      OB1 = A1 | B1 ;
      OA2 = 0 ;
      OB2 = 0 ;
      OC2 = 0 ;
      OB3 = A2 | B2 ;
      error += 2 ;
   }
}else if(mode == 5){
   if(error <= -3){
      OB1 = A1 & B1 ;
      OA2 = A1 & A2 ;
      OB2 = 1 ;
      OC2 = B1 & B2 ;
      OB3 = A2 & B2 ;
      error += 3 ;
   }else{
      OB1 = A1 | B1 ;
      OA2 = A1 & A2 ;
      OB2 = 1 ;
      OC2 = B1 & B2 ;
      OB3 = A2 | B2 ;
      error -= 1 ;
   }
}else if (mode == 6){
   OB1 = 1 ; OA2 = 1 ; OB2 = 1 ; OC2 = 1 ; OB3 = 1 ;
}
```

FIG. 7

< LOGIC OF PATTERN 34 >
  OA1 = A1 ; OB1 = A1 ; OC1 = B1 ; OD1 = B1 ;
  OA3 = A2 ; OB3 = A2 ; OC3 = B2 ; OD3 = B2 ;

if(i % 2 == 1){
      OA2 = A1 ; OB2 = A2 ; OC2 = B1 ; OD2 = B2 ;
  }else{
      OA2 = A2 ; OB2 = A1 ; OC2 = B2 ; OD2 = B1 ;
  }

< LOGIC OF PATTERN 42 >
  OA1 = A1 ; OB1 = B1 ;
  OA2 = A1 ; OB2 = B1 ;
  OA3 = A2 ; OB3 = B2 ;
  OA4 = A2 ; OB4 = B2 ;

< LOGIC OF PATTERN 43 >
  OA1 = A1 ; OC1 = B1 ;
  OA4 = A2 ; OC4 = B2 ;
  if(j % 2 == 1){
    OB1 = B1 ;
    OB2 = A1 ;
    OB3 = B2 ;
    OB4 = A2 ;
    if(mode = 3){
      OA2 = A2 ; OC2 = B2 ;
      OA3 = A1 ; OC3 = B1 ;
    }else{
      OA2 = A1 ; OC2 = B1 ;
      OA3 = A2 ; OC3 = B2 ;
    }
  }else{
    OB1 = A1 ;
    OB4 = B2 ;
    OA2 = A1 ; OC2 = B1 ;
    OA3 = A2 ; OC3 = B2 ;
    if(mode = 3){
      OB2 = A2 ; OB3 = B1 ;
    }else{
      OB2 = B1 ; OB3 = A2 ;
    }
  }

< LOGIC OF PATTERN 44 >
  OA1 = A1 ; OB1 = A1 ; OC1 = B1 ; OD1 = B1 ;
  OA2 = A1 ; OB2 = A1 ; OC2 = B1 ; OD2 = B1 ;
  OA3 = A2 ; OB3 = A2 ; OC3 = B2 ; OD3 = B2 ;
  OA4 = A2 ; OB4 = A2 ; OC4 = B2 ; OD4 = B2 ;

FIG. 8
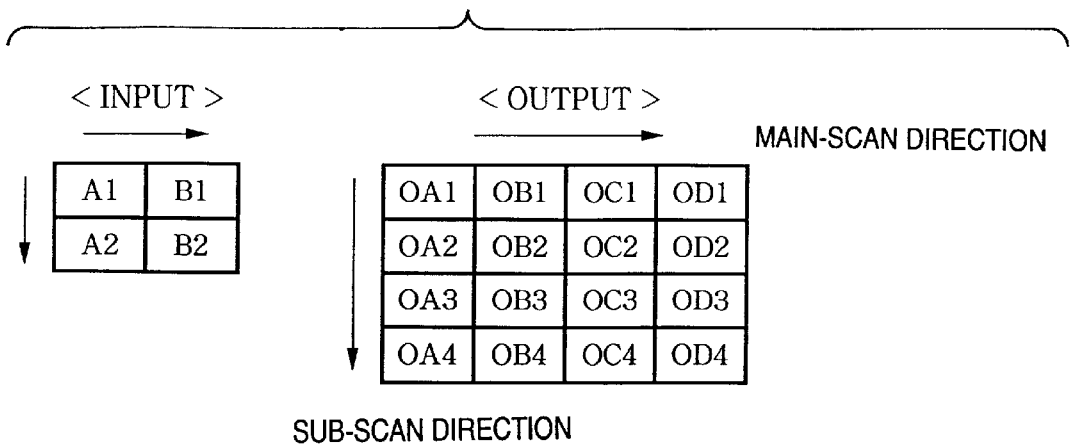
FIG. 9
< CLASSIFICATION OF INPUT PIXEL PATTERNS >
MODE 0 ;
MODE 1 ;
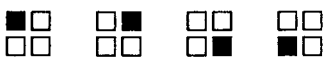
MODE 2 ;
MODE 3 ;
MODE 4 ;
MODE 5 ;
MODE 6 ;

IMAGE PROCESSING METHOD AND APPARATUS

BACKGROUND OF THE INVENTION

This invention relates to an image processing method and apparatus and to a zoom processing method used when bi-level image data is zoomed and output to a recording device having a high pixel density, particularly a zoom processing method used when bi-level image data, which includes a pseudo-halftone image employed in a facsimile machine or electronic file, is subjected to a resolution conversion and then output to a recording device.

Many methods such as the SPC method, 9 segmentation method and projection method have been studied and announced as methods of zooming bi-level images. First, the SPC method performs zooming by simply duplicating or subsampling pixels or lines. Since this method has a simple hardware configuration, it is employed in comparatively inexpensive facsimile machines. The projection method is accompanied by arithmetic processing, unlike the SPC method, and involves projecting a zoomed image on an original image and calculating the density value of zoomed image data from the density of the original image and the percentage of the area which the original image occupies in a zoomed pixel subdivision. This method provides comparatively good results with regard to a bi-level image such as a character or line drawing.

A disadvantage of these methods is that a pseudo-halftone image obtained by error diffusion method or the like develops a moiré pattern and undergoes a conspicuous deterioration in image quality.

FIG. 12 illustrates the result of enlarging image data, which consists of eight pixels in the main-scan direction and eight pixels in the sub-scan direction, by a factor of 5/4 by the SPC method. As shown in FIG. 12, the fourth and eighth rows in the sub-scan direction are duplicated by processing and so are the fourth and eighth columns in the main-scan direction. The SPC method is such that regardless of the fact that the ratio of black to white pixels in the original image is 1:1, the ratio of black to white pixels in the image data produced by processing is 46:54, meaning that the density of the original image has not been preserved. It will be understood that the expression of halftones is poor.

A combination of the projection method and error diffusion method and a combination of a binary-multivalue conversion by filtering and error diffusion method have been proposed as methods of obtaining comparatively good results when applied to pseudo-halftone images. With these techniques, however, considerable hardware resources such as multipliers and line buffers, the latter of which are for error diffusion method, are required. This results in a more costly apparatus.

SUMMARY OF THE INVENTION

Accordingly, an object of the present invention is provide an image processing method and apparatus through which the zooming of a bi-level image inclusive of a pseudo-halftone image binarized by error diffusion method or the like is realized by a hardware arrangement, such as for logical operation, simpler than that of the prior art, and wherein it is possible to obtain a density-preserving, excellent zoomed image, which is devoid of the moire seen with the SPC method or 9 segmentation method, even with regard to a pseudo-halftone image.

According to the present invention, the foregoing object is attained by providing an image processing apparatus for subjecting bi-level image data to zoom processing, comprising converting means for converting a processed block of the bi-level image data to a block having a size conforming to magnification of the zoom processing, and deciding means for deciding, based upon a pixel pattern of the bi-level image data, output values within the processed block converted by the converting means; the deciding means deciding the output values in such a manner that pixel density of the bi-level image data is preserved within the converted processed block.

According to the present invention, the foregoing object is attained by providing an image processing method for subjecting bi-level image data to zoom processing, comprising the steps of converting a processed block of the bi-level image data to a block having a size conforming to magnification of the zoom processing, and deciding, based upon a pixel pattern of the bi-level image data, output values within the converted processed block; the deciding step deciding the output values in such a manner that pixel density of the bi-level image data is preserved within the converted processed block.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram showing a logical operation which decides output pixel values of the patterns shown in FIG. 1;

FIG. 6 is a diagram showing a logical operation which decides output pixel values of the patterns shown in FIG. 1;

FIG. 7 is a diagram showing a logical operation which decides output pixel values of the patterns shown in FIG. 1;

FIG. 8 is a diagram showing correspondence between variables in FIGS. 5 through 7 and pixel positions;

FIG. 9 is a diagram showing modes in which pixels of an input image are classified by their arrangement;

DESCRIPTION OF THE PREFERRED EMBODIMENT

A preferred embodiment of the present invention will be described in detail below with reference to the accompanying drawings.

First, a pixel density conversion and a resolution conversion will be stipulated.

A pixel density conversion or a resolution density conversion involves increasing or decreasing the number of pixels in input image data in conformity with the resolution of the output unit. The basic operation is equivalent to enlargement or reduction. For example, converting image data of size A4 in which the number of pixels is 1728×2287 and the resolution is 203.2 dpi in the main-scan direction and 195.58 dpi in the sub-scan direction to image data having a resolution is 406.4 dpi in the main-scan direction and 391.16 dpi in the sub-scan direction by means of a pixel-density conversion involves converting one pixel to four pixels. Hence the total number of pixels is made 3456×4574. This processing is equivalent to two-fold enlargement processing in the main- and sub-scan directions.

Accordingly, in the description to follow, resolution conversion processing, enlargement/reduction processing and pixel density conversion processing all mean digital enlargement/reduction processing, and even in a case where resolution conversion or pixel density conversion has been combined with enlargement/reduction processing, this will be dealt with on the assumption that digital enlargement/reduction processing is performed using, as a reference, the magnification obtained by multiplying both magnifications together.

Enlargement processing according to this embodiment will be described in detail first with reference to the drawings. For the sake of simplicity, enlargement processing at any magnification from 100% to 200% will be taken as an example.

Figure 1:
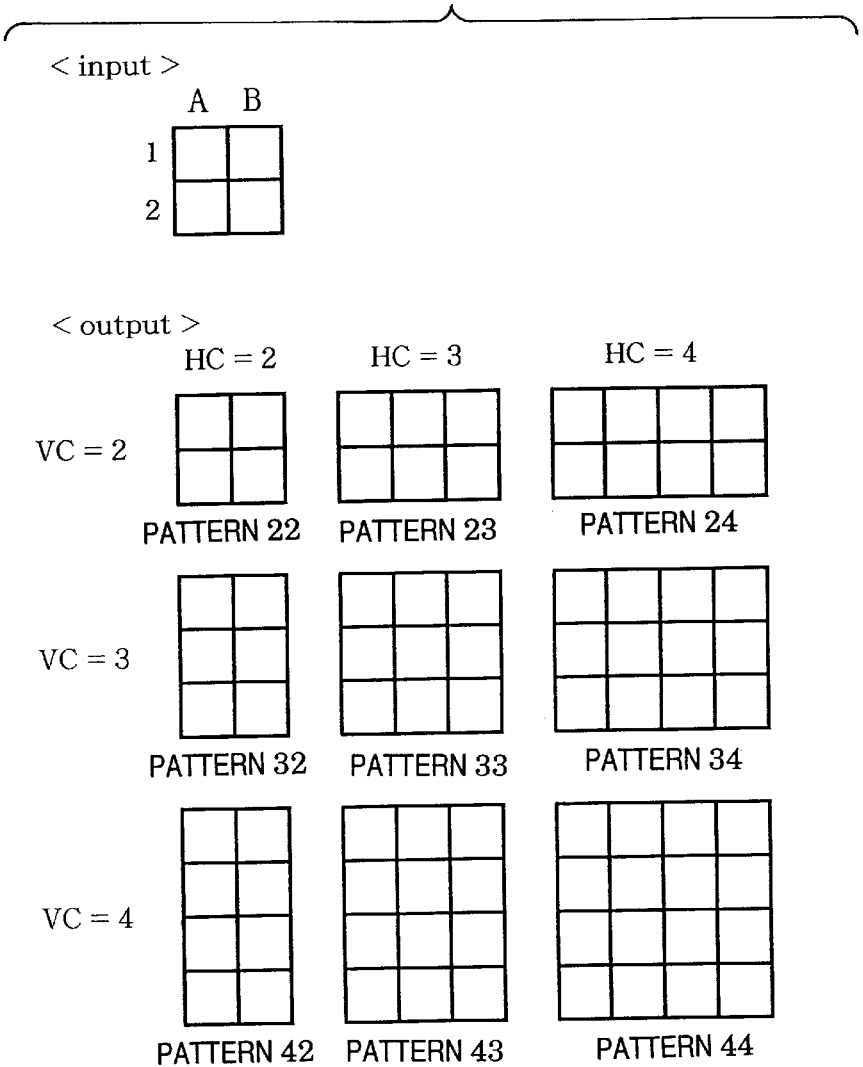
FIG. 1 is a diagram showing patterns in which conversions are made based upon the value of a pixel count HC in the main-scan direction and the value of a line count VC in a sub-scan direction.
Figure 2:
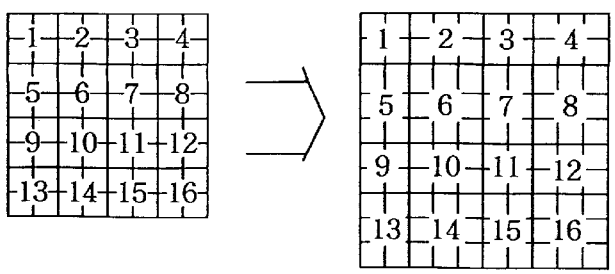
FIG. 2 is a diagram showing a state in which image data of 8×8 pixels is partitioned into 16 subdivisions of 2×2 pixels so that enlargement by a factor of 5/4 is performed.

In this embodiment, first the original image is divided into subdivisions of 2×2 pixels. Next, the number of pixels in each subdivision is converted to subdivisions having pixel counts of 2×2, 2×3, 2×4, 3×2, 3×3, 3×4, 4×2, 4×3 and 4×4, as shown in FIG. 1, depending upon a pixel count HC in the main-scan direction and a pixel count VC in the sub-scan direction decided by sequential operations block by block, described later. Enlargement processing at any magnification from 100% to 200% is carried out depending upon the combination of conversions block by block. For example, in order to simplify the description, a case in which magnification by a factor of 5/4 is applied in both the main and sub-scan directions will be considered as an example. As shown in FIG. 2, first image data consisting of 8×8 pixels is partitioned into 16 subdivisions of 2×2 pixels each. Let 1~16 represent block numbers assigned in numerical order in the main-scan direction starting from the upper left. Block 1 is left as is at 2×2 pixels, block 2 is converted to a block of 2×3 pixels, block 3 is left as is at 2×2 pixels, block 4 is converted to a block of 2×3 pixels, block 5 is converted to a block of 3×2 pixels, block 6 is converted to a block of 3×3 pixels and so on, with each individual subdivision being converted successively to a block having the corresponding number of pixels depending upon HC and VC decided by the magnification as described following. As a result, image data enlarged 5/4 times overall is produced.

Figure 3:
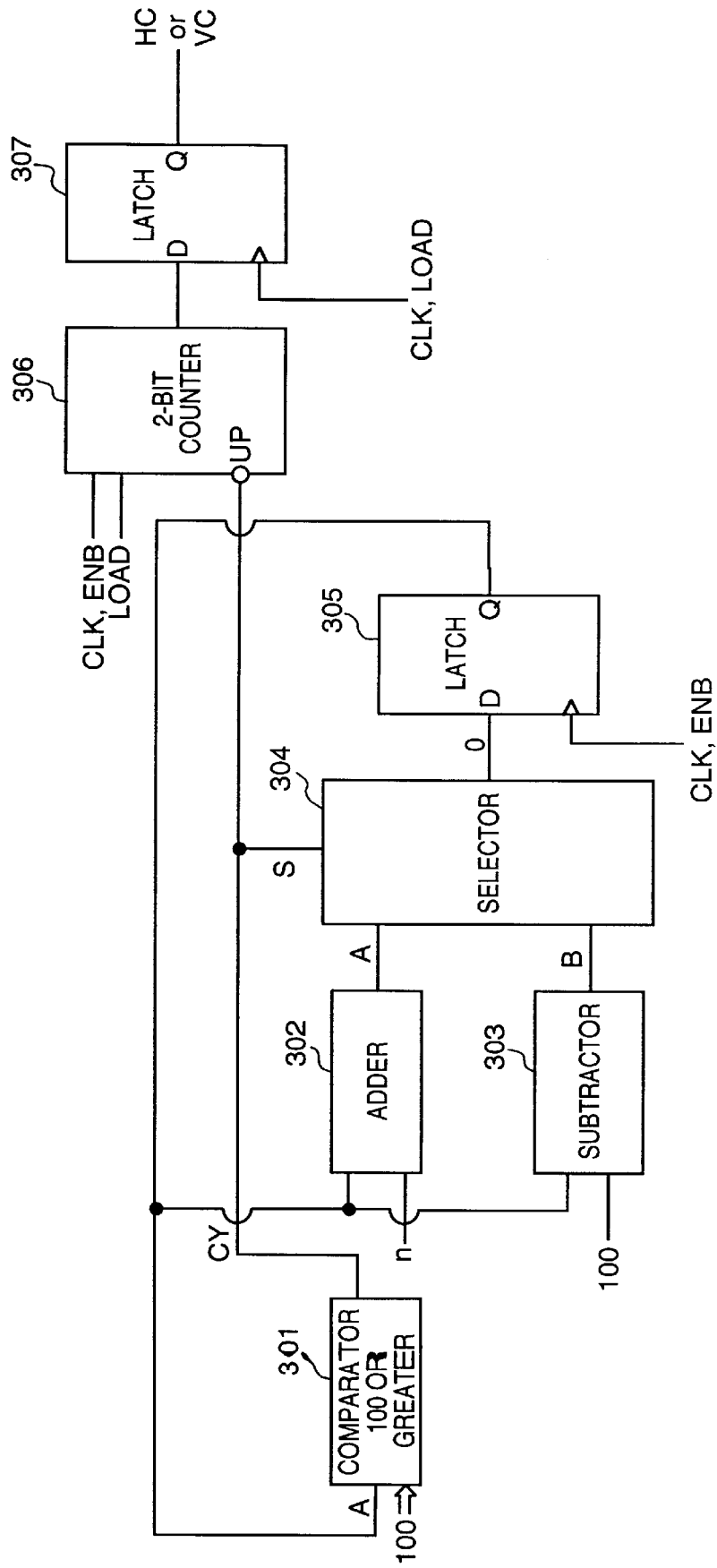
FIG. 3 is a diagram showing an example of an arithmetic circuit which decides a conversion pixel count (HC) in the main-scan direction and a conversion line count (VC) in the sub-scan direction of individual pixel blocks in a case where an arbitrary magnification has been decided.

Described next will be HC and VC, which decide the pixel conversion count block by block. FIG. 3 is a diagram showing an example of an arithmetic circuit which decides a conversion pixel count (HC) in the main-scan direction and a conversion line count (VC) in the sub-scan direction of individual pixel blocks in a case where an arbitrary magnification has been decided. Two of these circuits are used independently, one for the main-scan direction and the other for the sub-scan direction. In the circuit for the main-scan direction, the value of HC to be output is updated whenever one block is processed, whereas in the circuit for the sub-scan direction, the value of VC is updated whenever one block line is processed.

In the example depicted in FIG. 3, the setting of the magnification is given by 200/(100+n), and the values of HC, VC are output while being updated sequentially, whenever a block is processed, by the set value n in each of the main- and sub-scan directions. The circuit includes a comparator 301, which outputs an H-level signal if the output of a latch 305, described below, reaches 100 or more. An adder 302 adds the output of the latch 305 and the set value n of magnification. A subtractor 303 subtracts 100 from the output of latch 305. A selector 304 selects the output of the subtractor 303 when the output of the comparator 301 is the H level and the output of the adder 302 when the output of the comparator 301 is the L level. The latch 305 latches the output of the selector 304 anew when an ENB signal is at the H level and the leading edge of a clock CLK enters as an input. A 2-bit counter 306 is counted up when a CY output of the comparator 301 is at the L level and, moreover, the ENB signal is at the H level and the leading edge of the clock CLK enters as an input. If a LOAD signal is at the H level and the leading edge of the clock CLK enters as an input, then 0 is loaded as the value of the count. It should be noted that the output value of the counter 306 is the preceding value loaded in a latch within the counter. A latch 307 latches the output value of the counter when the LOAD signal is at the H level and the leading edge of the clock CLK enters as an input. This value is supplied to a logical operation block (described later) as the value of HC or VC.

Figure 4:
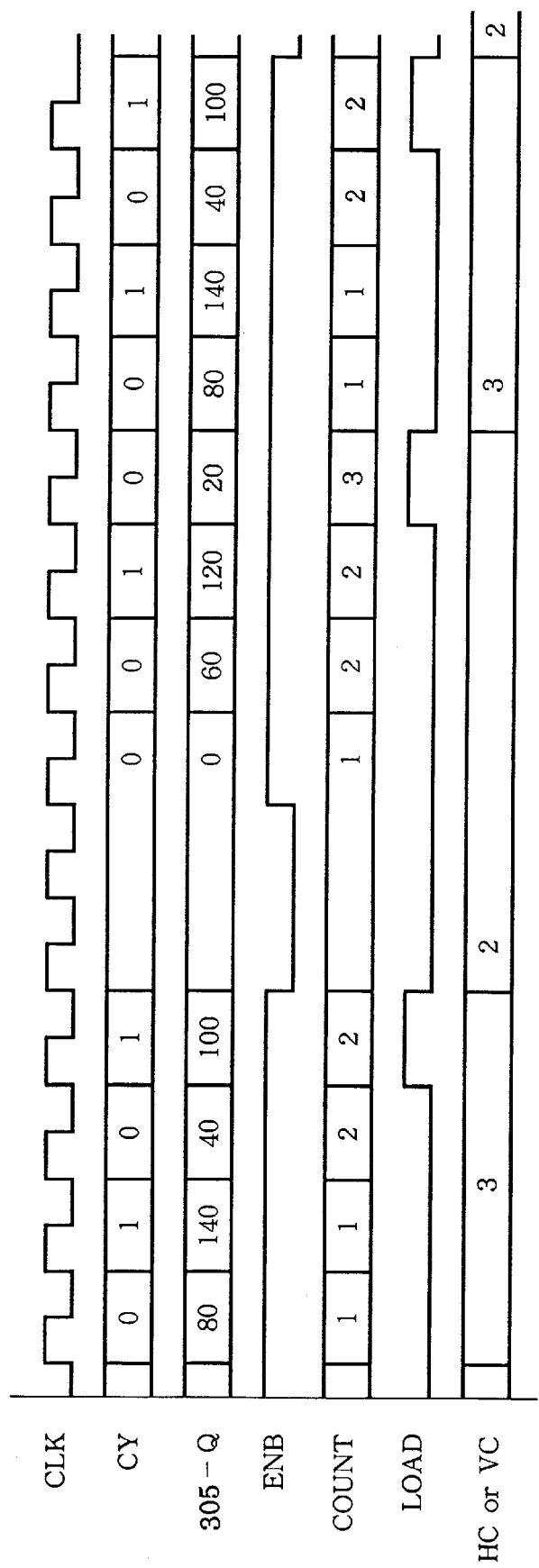
FIG. 4 is a timing chart showing the operation of the arithmetic circuit in case of HC.

FIG. 4 is a timing chart illustrating the operation of the arithmetic circuit in the case of HC. This shows a case in which the magnification setting n is 60, namely a case in which 5/4 has been set. First, when the value in latch 305 is 80, the output of the comparator 301 is at the L level and therefore the counter 306 is counted up at the leading edge of the clock CLK. At the same time, the selector 304 selects the output of the adder 302 so that 80+60=140 is latched in the latch 305. Since the value in latch 305 is 140 at the arrival of the next clock pulse, the output of the comparator 301 attains the H level, the counter 306 is not incremented, the selector 304 selects the output of the subtractor 303 and 140−100=40 is latched at the leading edge of the clock.

Since the value in latch 305 is 40 at the arrival of the next clock pulse, the output of the comparator 301 reverts to the L level, the counter 306 is incremented, the selector 304 selects the output of the adder 302 and 40+60=100 is latched. At the arrival of the next clock pulse the output of the comparator 301 attains the H level, the counter 306 is not incremented, the selector 304 selects the output of the subtractor 303 and 100−100=0 is latched in the latch 305. Furthermore, since the timing of this clock pulse corresponds to the fourth execution of the arithmetic operations, the LOAD signal attains the H level at this timing so that the value of counter 306 is loaded in the latch 307 and the counter is cleared to zero at the leading edge of the clock.

Thus, addition or subtraction is repeated successively so that the conversion pixel count in the main-scan direction is updated while the value of the count prevailing when the flag from the comparator 301 is at the L level is extracted every four clocks. In this example, the value in latch 307 returns to 80 in eight clocks, during which time 2 or 3 is output as the value of the count so that the magnification is 5/4. In the case of the line count VC in the sub-scan direction, the above-described block processing is executed, in a manner similar to the case of HC, whenever one block line is processed, whereby the value of VC is successively updated.

A method of deciding output pixel value will now be described. FIGS. 5 through 7 express the conversion logic of this embodiment in C language. The logical operations consist of nine patterns, namely patterns 22, 23, 24, 32, 33, 34, 42, 43 and 44, as illustrated, and the numbers of pixels of the output blocks correspond to the cases 2×2, 2×3, 2×4, 3×2, 3×3, 3×4, 4×2, 4×3 and 4×4 illustrated in FIG. 1. The variables A1, A2, B1 and B2 used here indicate the black-and-white values at the pixel positions in the input pixel block. A value is assumed to be 0 is case of white and 1 in case of black. Further, OA1~OA4, OB1~OB4, OC1~OC4, OD1~OD4 indicate the black and white values at the pixel positions output by conversion. A value is assumed to be 0 is case of white and 1 in case of black. FIG. 8 is a diagram showing correspondence between the variables in FIGS. 5 through 7 and pixel positions.

For cases other than 4×4, not all of OA1~OD4 shown in FIG. 8 are used. Therefore, let the necessary pixels be extracted in dependence upon the conversion pixel count using the upper left as a reference. For example, in a case where the output consists of two pixels in the main-scan direction and three rows in the sub-scan direction, the six values OA1, OB1, OA2, OB2, OA3 and OB3 are used.

Modes used in the logical operations are parameters obtained by classifying the arrangements of the pixels of an input image as input pixel patterns. Classification is of seven types 0~6 depending upon the input pixel pattern. An error is a parameter, which is a characterizing feature of this embodiment. Error indicates the difference, produced by processing up to the immediately preceding block, between the black-to-white ratio of the input and the black-to-white ratio of the output. Further, j is the value of a count incremented whenever one block is processed in the main-scan direction, and i is the value of a count incremented whenever one block line is processed in the sub-scan direction. It should be noted that j, i are for exceptional processing in patterns 34 and 43 and are used to suppress the occurrence of texture due to conversion.

The simple patterns 22, 24, 42 and 44 will be described first. The output pixels in this case multiplied by a factor of 1 or 2 in the main- and sub-scan directions. In this block conversion, each pixel is subjected to simple duplication processing, whereby the black-to-white ratio of the input pixels and the black-to-white ratio of the output pixels can be made the same. In pattern 22, therefore, the input is output as is. The pixels are duplicated in the main-scan direction and output in the case of pattern 24, in the sub-scan direction in the case of pattern 42, and in both the main- and sub-scan directions in the case of pattern 44.

Pattern 23 will be described next. In this logic, output pixels OA1, OA2, OC1 and OC2 are the result of outputting the input pixel values as is. The problem that arises with pattern 23 is that there are cases where the black-to-white ratios within the blocks cannot be made the same for the inputs and outputs. According to this embodiment, this problem is solved by a method of deciding the densities of OB1 and OB2.

First, in the case where the input pixel patterns are modes 0 and 6 shown in FIG. 9, all of the pixels are white and black, respectively, and therefore it will suffice if all of the output pixels become all white or all black. Accordingly, OB1 and OB2 both become white or both become black. In the case of modes 2, 3 and 4, the black-to-white ratios of the inputs are 1:1. Therefore, if the output pixels are decided so as to obtain three white pixels and three black pixels, then the density percentage is preserved within the block.

Thus, in the logical expression of conditional statements other than mode 1 or mode 5, it is so arranged that the values of OB1, OB2 are output as black in a case where any two pixels of the input pixels are both black. It is so arranged that two combinations of input pixels will not overlap owing to the arithmetic operations involving OB1 and OB2.

Next, in the case where the input pixel pattern is mode 1, the black-to-white ratio of the input is 1:3, namely one black pixel to three white pixels. However, there is no pixel pattern whose ratio is the same as this. Therefore, if consideration is given to the black-to-white ratio of the nearest output, we have a ratio of 1:5 (one black pixel to five white pixels) or 1:2 (one black pixel to two white pixels). Accordingly, the black-to-white ratio of the input and the black-to-white ratio of the output differ and an error variable is used as a parameter which corrects for this. According to this logic, a changeover is made, in dependence upon the error value that was generated by processing up to the immediately preceding block, between an operation is which one black pixel and five white pixels are output and an operation is which two black pixels and four white pixels are output. Accordingly, in a case where the output is made two black pixels and four white pixels, the conversion error of the black-to-white ratio produced is 2/6−1/4=1/12 and too many black pixels are printed. The conversion error in a case where the output is made one black pixel and five white pixels is 1/6−1/4=−1/12 and too many white pixels are printed. In order to effect normalization, the result of dividing the output pixels further by four is used as a reference and the above-mentioned value is multiplied by the output pixel count 6×4=24.

Accordingly, in case of two black pixels and four white pixels, too much black is output and, hence, 2 is subtracted from the error variable. In case of one black pixel and five white pixels, too much white is output and, hence, 2 is added to the error variable. Thus the error, namely the density correction parameter, is updated. The decision as to whether one black pixel and five white pixels or two black pixels and four white pixels are output is made by changing over between these two outputs depending upon whether the error produced up to the immediately preceding block is equal to or greater than 2. Two black pixels and four white pixels are output if the error is equal to or greater than 2 and one black pixel and five white pixels are output otherwise. In case of mode 5, the black-to-white ratio is the inverse of mode 1. Consequently, a changeover between an output of four black pixels and two white pixels and an output of five black pixels and one white pixel is performed while using the error variable in a manner similar to that described above. As for the logical expression, whether the value of OB1 is made the OR or the AND of A1 and B1 and, similarly, whether the value of OB2 is made the OR or the AND of A2 and B2, is decided by switching between the OR and the AND based upon the error value.

Next, in the case of pattern 32, this pattern is obtained by interchanging the main- and sub-scan directions of pattern 23. The logical expression is constructed in such a manner that the values of OA2 and OB2 will be switched between dynamically depending upon the error variable through a logical structure similar to that of pattern 23.

Pattern 33 will be described next. In this case, the output pixels are controlled by the error value propagated from the processing up to the preceding block using the error which is the difference between the black-to-white ratio of the input pixels and the black-to-white ratio of the output pixels, and the error is updated in dependence upon the output pixel values. This operation is similar to that performed in the case of patterns 23 and 32. First, the pixel values of OA1, OA3, OC1 and OC3, which are at the output terminals, are obtained by outputting the corresponding input pixel values as is, as in the manner of patterns 23 and 32. In pattern 33, the pixel values of the remaining OB1, OA2, OB2, OC2 and OB3 are changed over by the error variable. First, in the case of mode 0, all pixels are white and therefore the pixels of OB1, OA2, OB2, OC2, OB3 are all output as 0. In the case of mode 6, all pixels are black and therefore the pixels of OB1, OA2, OB2, OC2, OB3 are all output as 1.

Next, in case of mode 1, the black-to-white ratio of the input pixels is 1:3 and therefore 2:7 (two black pixels to seven white pixels) or 3:6 (three black pixels to six white pixels) are obtained as the outputs having the nearest ratio. Accordingly, in a case where there are two black pixels and seven white pixels, $2/9-1/4=-1/36$ is obtained as the conversion error of the black-to-white ratio generated. In the case of three black pixels and six white pixels, we have $3/9-1/4=3/36$. When normalization is performed at a value obtained by dividing the output pixels by four, in a manner similar to that in the case of patterns 23 and 32, the error produced is −1 in case of two black pixels and seven white pixels and 3 in case of three black pixels and six white pixels. Accordingly, 1 is added to the error in case of two black pixels and seven white pixels and 3 is subtracted from the error in case of three black pixels and six white pixels. The changeover from two black pixels and 7 white pixels to three black pixels and six white pixels, is performed based upon the value of the error up to the immediately preceding block. Three black pixels and six white pixels are selected in a case where the error value is equal to or greater than 3 and two black pixels and seven white pixels are selected in a case where the error value has any other value.

Each of the logical expressions of OB1, OA2, OB2, OC2 and OB3 of FIGS. 5 through 7 are constructed in such a manner that, while the above-mentioned items are satisfied, pixels near the input pixel positions become black. Further, in case of mode 5, this mode is obtained by inverting the black and white pixels of mode 1. Therefore, the sign of mode 1 is reversed, whether a changeover is made to two white pixels and seven black pixels or to three white pixels and six black pixels is made depending upon whether the error is 3 or greater, 1 is subtracted from the error in case of two white pixels and seven black pixels and 3 is added to the error in case of three white pixels and six black pixels. In case of modes 2, 3 and 4, the black-to-white ratio of the input pixels is 1:1 and therefore four black pixels and five white pixels or five black pixels and four white pixels are obtained as the output values having the nearest ratio. Accordingly, in a case where there are four black pixels and five white pixels, $4/9-1/2=-2/36$ is obtained as the conversion error of the black-to-white ratio generated. In the case of five black pixels and four white pixels, the error obtained is $5/9-1/2=2/36$. Therefore, when normalization is performed at a value obtained by dividing the output pixels by four, in a manner similar to that of mode 1, the error produced is −2 in case of four black pixels and five white pixels and 2 in case of five black pixels and four white pixels.

In FIGS. 5 through 7, 2 is added to the error in case of four black pixels and five white pixels and 2 is subtracted from the error in case of five black pixels and four white pixels. The changeover between four black pixels and five white pixels and five black pixels and four white pixels is performed based upon the error value up to the immediately preceding block. The changeover is to five black pixels and four white pixels if the error is 2 or greater and to four black pixels and five white pixels if the error is less than 2. The value of OB1, OA2, OB2, OC2 and OB3 are such that the above-mentioned items are satisfied and pixels near the input pixel positions become black.

An example in which a toggle counter is used in case of the patterns 34 and 43 will now be described as exceptional processing. In the case of pattern 34, the black-to-white ratio of the output pixels and the black-to-white ratio of the input pixels can be made the same. However, when the output pixel density is simply output in fixed fashion based upon the values of the input signals, an identical output pattern is output for an identical input pattern and this becomes noticeable as texture. Accordingly, the occurrence of identical texture is suppressed by changing over OA2, OB2, OC2, OD2 of the output values, by using a toggle counter, depending upon which of the input pixel values is referred to. With regard also to pattern 43, the output pixels of OB1, OB2, OB3, OB4, OA2, OA3, OC2, OC3 are changed over, in accordance with a main-scan toggle counter and the mode, depending upon which input pixel values are referred to, in a manner similar to that of pattern 34. As a result, logical expression are constructed so as to suppress the occurrence of noticeable fixed texture.

Figure 10:
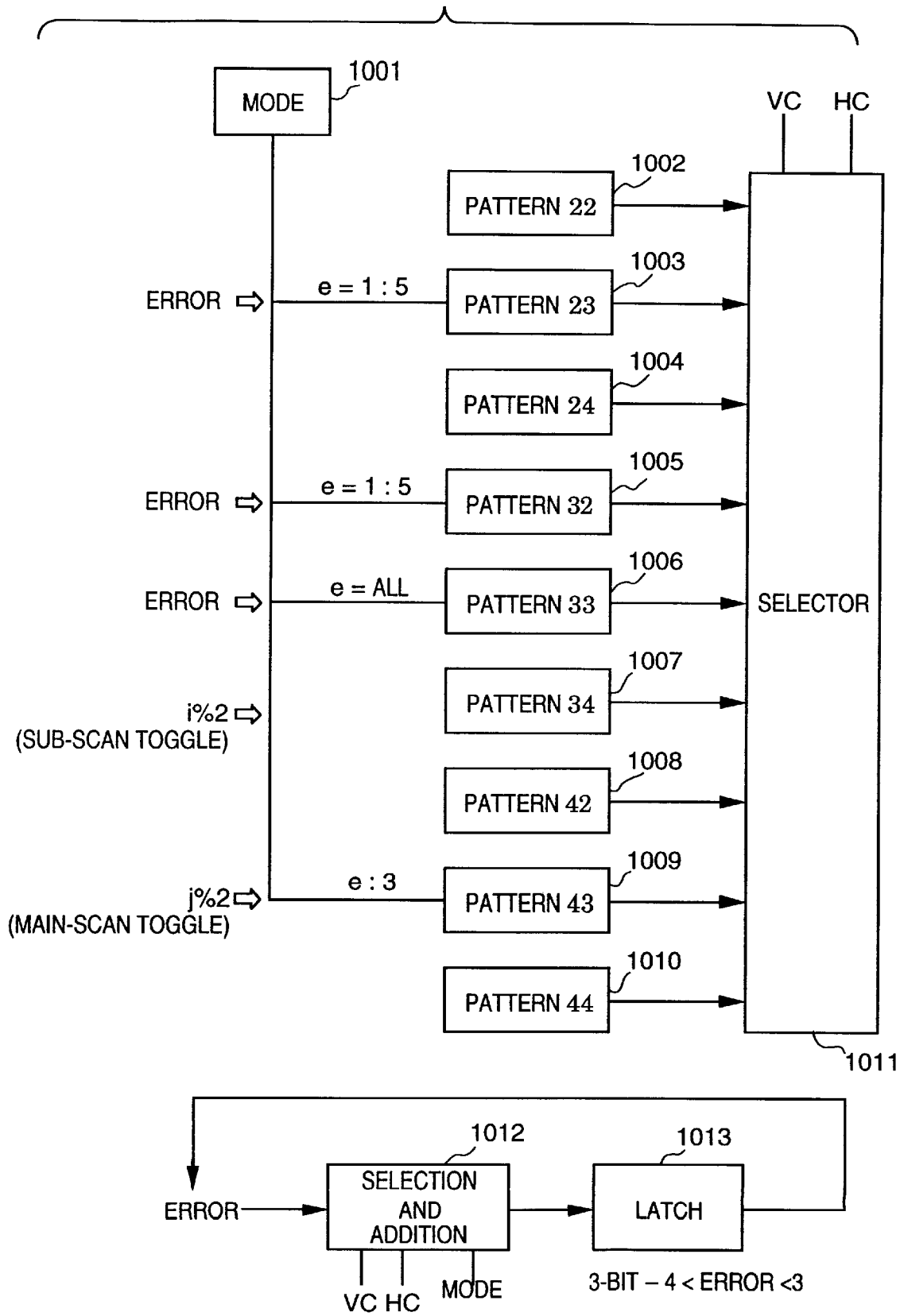
FIG. 10 is a diagram showing a hardware configuration for performing a logical operation on output pixel values in this embodiment.

FIG. 10 is a diagram showing a hardware configuration for performing a logical operation on output pixel values in this embodiment. The hardware includes a combining circuit 1001 for outputting a mode value which distinguishes the pattern of input pixels in dependence upon the input pixels. Combining circuits 1002~1010 perform logical operations on each of the patterns. A selector 1011 selects any of the circuits 1002~1010 in dependence upon HC, VC from the circuitry, constructed as shown in FIG. 3, for deciding the number of output pixels. An adder/subtractor & selector 1012 calculates a new error based upon the mode value of 1001, the values of HC, VC and the error up to the processing of the immediately preceding block. A latch 1013 latches the error updated block by block.

Thus, any magnification can be achieved by deciding the output values that corresponding to 2×2 input pixel values while changing over HC, VC and the value of the error whenever block processing is executed.

Figure 11:
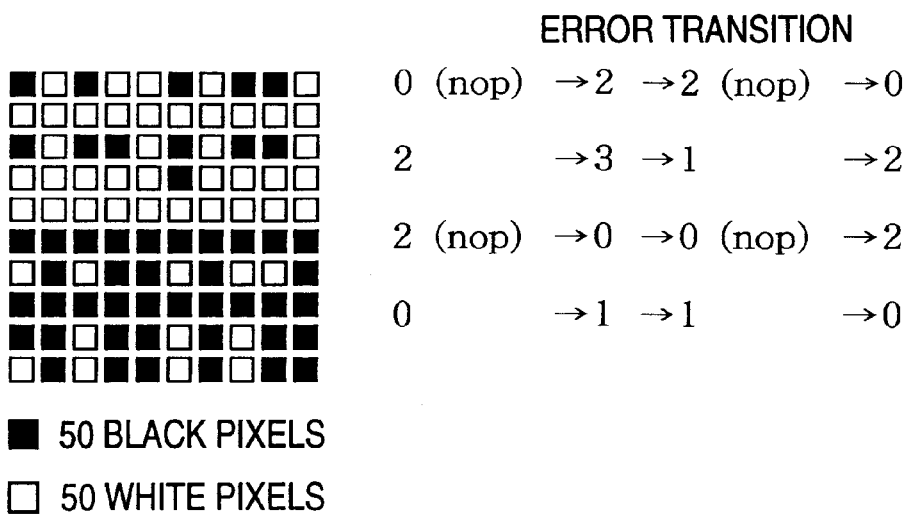
FIG. 11 is a diagram showing results of subjecting 8×8 image data to conversion processing according to this embodiment.
Figure 12:
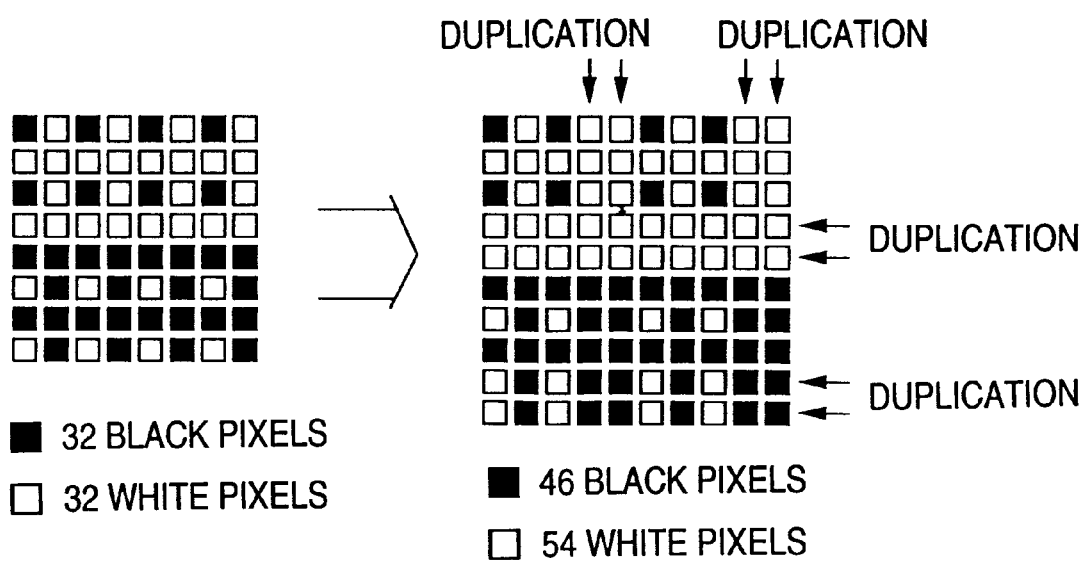
FIG. 12 is a diagram showing the result of enlarging image data, which consists of eight pixels in the main-scan direction and eight rows in the sub-scan direction, by a factor of 5/4 by the SPC method.

FIG. 11 is a diagram showing results of subjecting the above-mentioned 8×8 image data to conversion processing according to this embodiment. It will be understood that unlike FIG. 12, which is the result of the SPC method, the ratio of the black pixels to the white pixels is 1:1 and density is preserved.

In this embodiment, a case in which enlargement is performed at a rate of 100%~200% is described as an example. However, it is possible to deal with enlargement at a rate greater than 200% by adopting an arrangement based upon combinations of conversion pixels blocks n×n, n×1, 1×n and 1×1 using the same approach. Enlargement at any magnification can be realized by a simple circuit arrangement by introducing a method of propagating error produced from a difference between the black-to-white ratio of a variable block and the black-to-white ratio of the original block.

Thus, use is made of an algorithm in which an original image is partitioned into image blocks of N1×N2 pixels and output patterns are controlled sequentially based upon residual error, which is produced as a result of processing blocks, in such a manner that the black-to-white density ratio of the individual blocks is preserved. As a result, extensive use need not be made of line buffer control and numerical arithmetic circuits for multiplication or the like, unlike the prior art. It is possible to obtain a zoomed image having any magnification and exhibiting excellent density preservation with regard to pseudo-halftone images by simple logical operation circuitry, one adder/subtractor and combining circuits.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the functions according to the embodiment, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, it goes without saying that the present invention covers a case where an operating system (OS) or the like working on the computer performs a part of or the entire process in accordance with the designation of program codes and implements the functions according to the embodiments.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiment.

Thus, in accordance with the present invention, as described above, the zooming of a bi-level image inclusive of a pseudo-halftone image binarized by error diffusion or the like is realized by a hardware arrangement, such as for logical operation, simpler than that of the prior art, and it is possible to obtain a density-preserving, excellent zoomed image, which is devoid of the moire pattern seen with the SPC method or 9 segmentation method, even with regard to a pseudo-halftone image.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for subjecting bi-level image data to zoom processing, comprising:
   converting means for converting a plurality of processed blocks of the bi-level image data to a plurality of blocks having at least two different sizes and an aggregate size conforming to a magnification of the zoom processing; and
   deciding means for deciding, based upon a pixel pattern of the bi-level image data, output values within each processed block converted by said converting means;
   said deciding means deciding the output values in such a manner that pixel density of the bi-level image data is preserved within each converted processed block,
   wherein said converting means determines, for each processed block, a block size, based on at least one of the magnification and a portion of the processed block, and converts the processed block to a block having the determined block size.

2. The apparatus according to claim 1, wherein said converting means converts the processed blocks to blocks having the aggregate size conforming to the magnification based upon a number of pixels in a main-scan direction and a number of lines in a sub-scan direction decided in conformity with the magnification of the zoom processing.

3. The apparatus according to claim 2, wherein said converting means converts the processed blocks to blocks having the aggregate size conforming to the magnification based upon a combination of a plurality of patterns decided by a number of pixels in the main-scan direction and a number of lines in a sub-scan direction.

4. The apparatus according to claim 3, wherein said deciding means decides the output values in such a manner that the pixel density ratio of black pixels and white pixels of the bi-level image data is preserved within each converted processed block.

5. The apparatus according to claim 4, wherein said deciding means decides the output values of the plurality of patterns in such a manner that the pixel density ratio is preserved with respect to each of the plurality of patterns.

6. The apparatus according to claim 5, wherein said deciding means decides the output values of the next pattern in dependence upon a difference, produced when the output values of the preceding pattern are decided, between pixel density ratio of an input and pixel density ratio of an output.

7. An image processing method for subjecting bi-level image data to zoom processing, comprising the steps of:
   converting a plurality of processed blocks of the bi-level image data to a plurality of blocks having at least two different sizes and an aggregate size conforming to a magnification of the zoom processing; and
   deciding, based upon a pixel pattern of the bi-level image data, output values within each converted processed block;
   said deciding step deciding the output values in such a manner that pixel density of the bi-level image data is preserved within each converted processed block,
   wherein the converting step includes steps of determining, for each processed block, a block size, based on at least one of the magnification and a portion of the processed block, and converting the processed block to a block having the determined block size.

8. The method according to claim 7, wherein said converting step converts the processed blocks to blocks having the aggregate size conforming to the magnification based upon a number of pixels in a main-scan direction and a number of lines in a sub-scan direction decided in conformity with the magnification of the zoom processing.

9. The method according to claim 8, wherein said converting step converts the processed blocks to blocks having the aggregate size conforming to the magnification based upon a combination of a plurality of patterns decided by a number of pixels in the main-scan direction and a number of lines in a sub-scan direction.

10. The method according to claim 9, wherein said deciding step decides the output values in such a manner that the pixel density ratio of black pixels and white pixels of the bi-level image data is preserved within each converted processed block.

11. The method according to claim 10, wherein said deciding step decides the output values of the plurality of patterns in such a manner that the pixel density ratio is preserved with respect to each of the plurality of patterns.

12. The method according to claim 11, wherein said deciding step decides the output values of the next pattern in dependence upon a difference, produced when the output values of the preceding pattern are decided, between pixel density ratio of an input and pixel density ratio of an output.

* * * * *

UNITED STATES PATENT AND TRADEMARK OFFICE
CERTIFICATE OF CORRECTION

PATENT NO. : 6,233,366 B1  Page 1 of 1
DATED : May 15, 2001
INVENTOR(S) : Ushida It is certified that error appears in the above-identified patent and that said Letters Patent is hereby corrected as shown below:

Column 1,
Line 55, "is" should read -- is to --.

Column 3,
Line 11, "is" should read -- of --.

Column 5,
Lines 10 and 14, "is case" should read -- in case --; and
Line 40, "case" should read -- case are --.

Column 6,
Lines 18 and 19, "is" should read -- in --.

Column 7,
Line 40, "is made" should be deleted.

Column 8,
Line 20, "are" should read -- is --; and
Line 37, "corresponding" should read -- correspond --.

Signed and Sealed this

Eighth Day of January, 2002

*Attest:*

*Attesting Officer*

JAMES E. ROGAN
*Director of the United States Patent and Trademark Office*